US012689160B2

(12) United States Patent
Zhu et al.

(10) Patent No.: US 12,689,160 B2
(45) Date of Patent: Jul. 21, 2026

(54) ELECTRICAL CONNECTOR WITH IMPROVED SHIELDING PIECE

(71) Applicant: DONGGUAN LUXSHARE TECHNOLOGIES CO., LTD, Dongguan City (CN)

(72) Inventors: Shangfeng Zhu, Dongguan City (CN); Tao Song, Dongguan City (CN); Kun Liu, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 365 days.

(21) Appl. No.: 18/420,377

(22) Filed: Jan. 23, 2024

(65) Prior Publication Data

US 2024/0364057 A1 Oct. 31, 2024

(30) Foreign Application Priority Data

Apr. 26, 2023 (CN) ......................... 202310466727.8

(51) Int. Cl.
*H01R 13/6585* (2011.01)
*H01R 13/04* (2006.01)
*H01R 13/40* (2006.01)
*H01R 13/652* (2006.01)

(52) U.S. Cl.
CPC ......... *H01R 13/6585* (2013.01); *H01R 13/04* (2013.01); *H01R 13/40* (2013.01); *H01R 13/652* (2013.01)

(58) Field of Classification Search
None
See application file for complete search history.

(56) References Cited

U.S. PATENT DOCUMENTS 11,831,108 B2 * 11/2023 Little ................. H01R 13/6592
12,057,663 B2 * 8/2024 Liu ...................... H01R 13/424
12,107,370 B2 * 10/2024 Huang ............... H01R 13/6461
12,451,627 B2 * 10/2025 Zerebilov ............ H01R 13/405

FOREIGN PATENT DOCUMENTS

CN 105261892 A 1/2016
CN 114389113 A 4/2022

* cited by examiner

*Primary Examiner* — Ross N Gushi
(74) *Attorney, Agent, or Firm* — Birch, Stewart, Kolasch & Birch, LLP

(57) ABSTRACT

An electric connector includes an insulating body, a first terminal module and a first shielding piece. The first terminal module is mounted to the insulating body. The first terminal module includes a number of pairs of first signal terminals and a number of first ground terminals. Each first ground terminal includes a first main body portion, a first mating portion and a first tail portion. The first tail portions of the number of first ground terminals are connected together through a first connection portion. The first shielding piece includes a first shielding portion and a first extension portion connected to the first shielding portion. The first main body portion is at least partially in contact with the first shielding portion. The first connection portion is at least partially in contact with the first extension portion.

20 Claims, 22 Drawing Sheets

ELECTRICAL CONNECTOR WITH IMPROVED SHIELDING PIECE

CROSS-REFERENCE TO RELATED APPLICATION

This patent application claims priority of a Chinese Patent Application No. 202310466727.8, filed on Apr. 26, 2023 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

An electrical connector in the related art generally includes an insulating body, a plurality of conductive terminals and a shielding piece. Each conductive terminal includes a body portion, a mating portion extending from the body portion and a tail portion extending from the body portion. The plurality of conductive terminals generally include a plurality of signal terminals and a plurality of ground terminals. The shielding piece is in contact with the body portions of the ground terminals to improve the shielding effect. However, for high-density electrical connectors used in high-frequency transmission, the number of terminals is large and densely distributed, and the distance between adjacent terminals is relatively short. When transmitting high-frequency electronic signals, the crosstalk between adjacent terminals is relatively large, resulting in unstable signal transmission.

SUMMARY

An object of the present disclosure is to provide an electrical connector capable of reducing crosstalk interference.

In order to achieve the above object, the present disclosure adopts the following technical solution: an electrical connector, including: an insulating body; a first terminal module mounted to the insulating body; the first terminal module including a plurality of first conductive terminals, the plurality of first conductive terminals including a plurality of pairs of first signal terminals, a plurality of first ground terminals and a first connection portion, each pair of the first signal terminals and each of the first ground terminals being arranged alternately; each first ground terminal including a first main body portion, a first mating portion extending from one end of the first main body portion, and a first tail portion extending from another end of the first main body portion; the first tail portions of the plurality of first ground terminals being connected in series through the first connection portion; a first shielding piece including a first shielding portion and a first extension portion connected to the first shielding portion; the first main body portions of the plurality of first ground terminals being at least partially in contact with the first shielding portion; the first connection portion being at least partially in contact with the first extension portion; and a plurality of first cables, each first cable including a first signal conductor and a first ground conductor, the first ground conductor being connected to a corresponding first tail portion, the first signal conductor being connected to a corresponding first signal terminal; the first ground conductor and the first shielding piece being located on opposite sides in a thickness direction of the first ground terminal.

In order to achieve the above object, the present disclosure adopts the following technical solution: an electrical connector, including: an insulating body defining a mating slot and a receiving groove communicating with the mating slot, the mating slot being configured to receive a mating connector; a first terminal module at least partially received in the receiving groove of the insulating body; the first terminal module including a plurality of first conductive terminals, the plurality of first conductive terminals including a plurality of pairs of first signal terminals, a plurality of first ground terminals and a first connection portion, each pair of the first signal terminals and each of the first ground terminals being arranged alternately; each first ground terminal including a first main body portion, a first mating portion and a first tail portion; the first tail portions of the plurality of first ground terminals being connected in series through the first connection portion; a second terminal module at least partially received in the receiving groove of the insulating body; the second terminal module including a plurality of second conductive terminals, the plurality of second conductive terminals including a plurality of pairs of second signal terminals, a plurality of second ground terminals and a second connection portion, each pair of the second signal terminals and each of the second ground terminals being arranged alternately; each second ground terminal including a second main body portion, a second mating portion and a second tail portion; the second tail portions of the plurality of second ground terminals being connected in series through the second connection portion; a first shielding piece including a first shielding portion and a first extension portion; the first main body portions of the plurality of first ground terminals being at least partially in contact with the first shielding portion; the first connection portion being at least partially in contact with the first extension portion; and a second shielding piece including a second shielding portion and a second extension portion; the second main body portions of the plurality of second ground terminals being at least partially in contact with the second shielding portion; the second connection portion being at least partially in contact with the second extension portion; wherein the first shielding piece and the second shielding piece are disposed adjacent to each other, and are located between the plurality of first conductive terminals and the plurality of second conductive terminals along a thickness direction of the electrical connector.

In the present disclosure, the first connection portion is used to connect the plurality of first ground terminals together; the first shielding portion is in contact with the first main body portion of the first ground terminal, and the first extension portion is in contact with the first connection portion, so that the first shielding piece is in contact with two areas of the first ground terminal. The electrical connector of the present disclosure is capable of performing good shielding effect for the first signal terminals, reducing crosstalk interference between signals transmitted by adjacent pairs of the first signal terminals, and maintaining the effectiveness of signal transmission.

DETAILED DESCRIPTION

Figure 1:
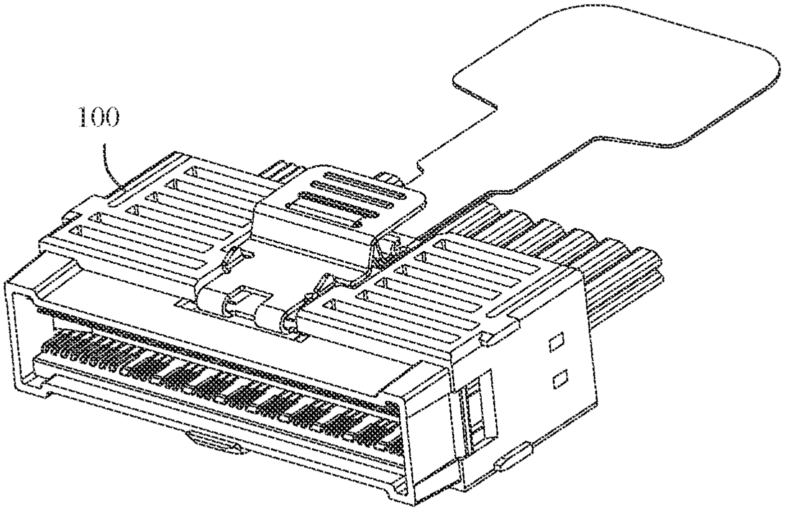
FIG. 1 is a perspective schematic view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 27, the present disclosure discloses an electrical connector 100 configured to mate with a mating connector (not shown). The mating connector is at least partially inserted into the electrical connector 100 along a mating direction M.

Figure 3:
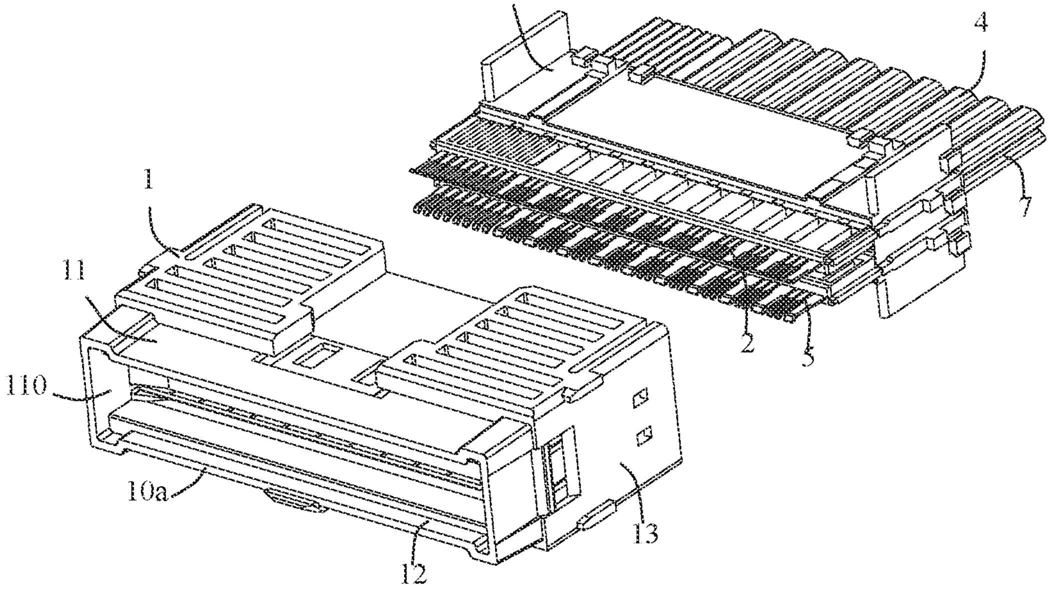
FIG. 3 is an exploded schematic view of some components of FIG. 2.
Figure 4:
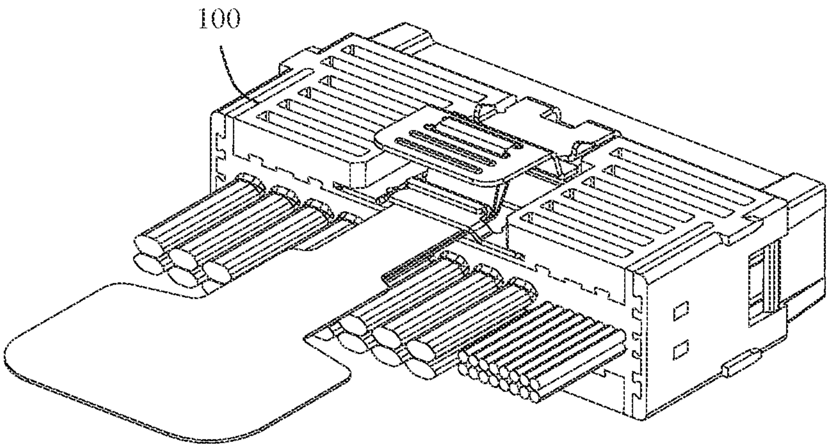
FIG. 4 is a schematic perspective view of FIG. 1 from another angle.
Figure 7:
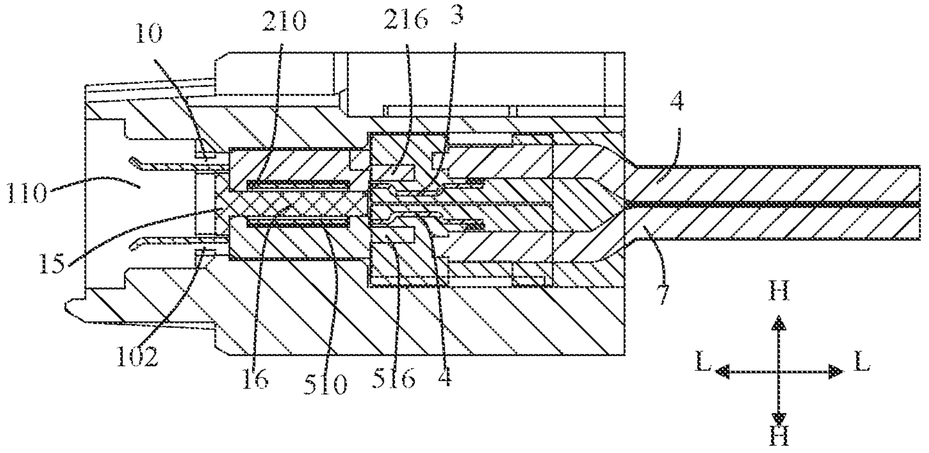
FIG. 7 is a schematic cross-sectional view of some components taken along line A-A in FIG. 2.
Figure 8:
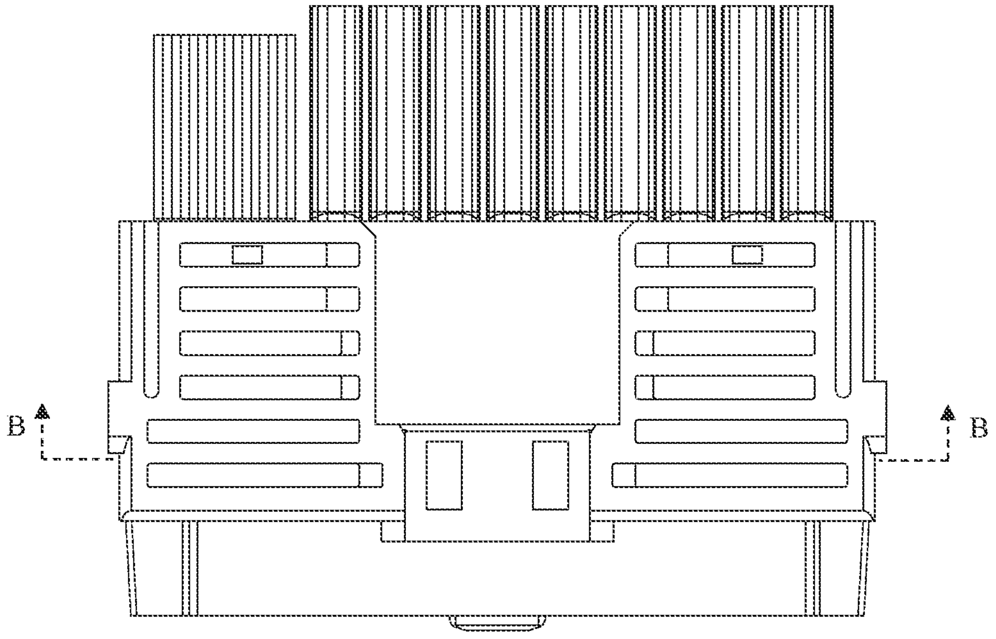
FIG. 8 is a top view of some components in FIG. 2.

Referring to FIG. 3 and FIG. 7, the electrical connector 100 includes an insulating body 1, a first terminal module 2 mounted to the insulating body 1, a first shielding piece 3 mated with the first terminal module 2, a plurality of first cables 4 connected to the first terminal module 2, a second terminal module 5 mounted to the insulating body 1, a second shielding piece 6 mated with the second terminal module 5, and a plurality of second cables 7 connected to the second terminal module 5.

Figure 6:
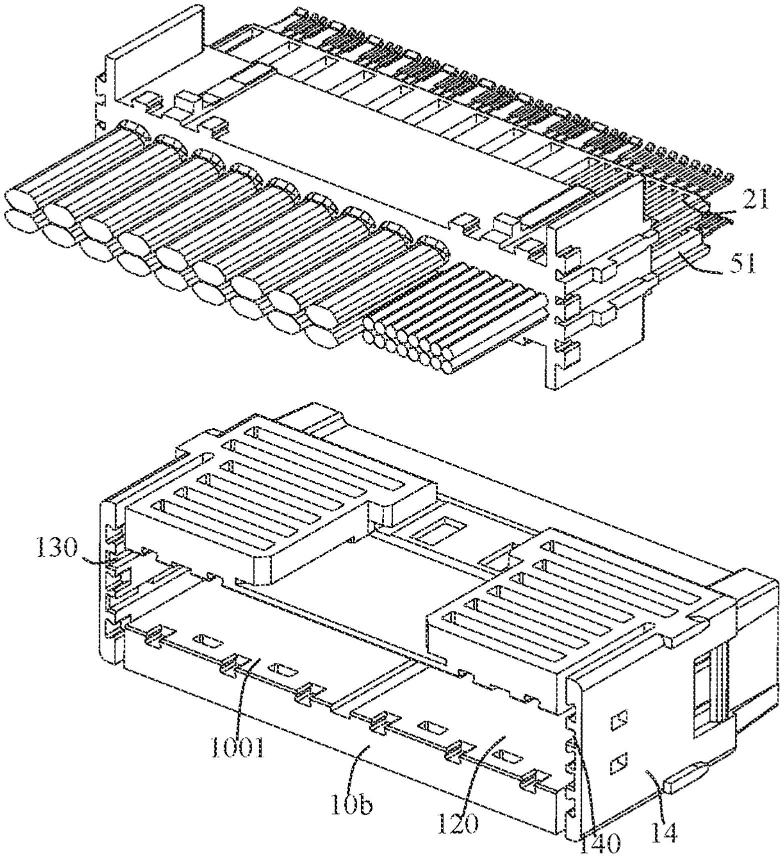
FIG. 6 is an exploded schematic view of some components of FIG. 5.

Referring to FIG. 3 and FIG. 7, the insulating body 1 defines a mating slot 110. The insulating body 1 includes a mating surface 10*a* which is located at a front end of the insulating body 1. The mating slot 110 extends through the mating surface 10*a*. Referring to FIG. 6, the insulating body 1 defines a receiving groove 120 and a mounting surface 10*b* which is located at a rear end of the insulating body 1. The receiving groove 120 extends through the mounting surface 10*b*. The receiving groove 120 communicates with the mating slot 110.

Specifically, referring to FIG. 3 and FIG. 6, the insulating body 1 includes a top wall portion 11, a bottom wall portion 12 disposed opposite to the top wall portion 11, a first side wall portion 13 connecting one end of the top wall portion 11 and one end of the bottom wall portion 12, and a second side wall portion 14 connecting another end of the top wall portion 11 and another end of the bottom wall portion 12. The top wall portion 11, the bottom wall portion 12, the first side wall portion 13 and the second side wall portion 14 are jointly enclosed to form a receiving space 1001. Referring to FIG. 7, a first inner plate 15 is provided in the receiving space 1001. The receiving groove 120 and the mating slot 110 are located on opposite sides in a thickness direction of the first inner plate 15. The insulating body 1 further includes a second inner plate 16 extending from the first inner plate 15 toward the receiving groove 120. The second inner plate 16 is perpendicular to the first inner plate 15. Both the first terminal module 2 and the second terminal module 5 are installed in the receiving groove 120. The first terminal module 2 and the second terminal module 5 are located on opposite sides in a thickness direction of the second inner plate 16. Both the first cables 4 and the second cables 7 extend into the receiving groove 120. The thickness direction of the second inner plate 16 is parallel to a height direction H-H of the insulating body 1. The thickness direction of the first inner plate 15 is parallel to a length direction L-L of the insulating body 1. A first gap 101 is formed between the first inner plate 15 and the top wall portion 11. A second gap 102 is formed between the first inner plate 15 and the bottom wall portion 12. The first gap 101 facilitates the assembly of the first terminal module 2 on the insulating body 1. The second gap 102 facilitates the assembly of the second terminal module 5 on the insulating body 1.

Figure 11:
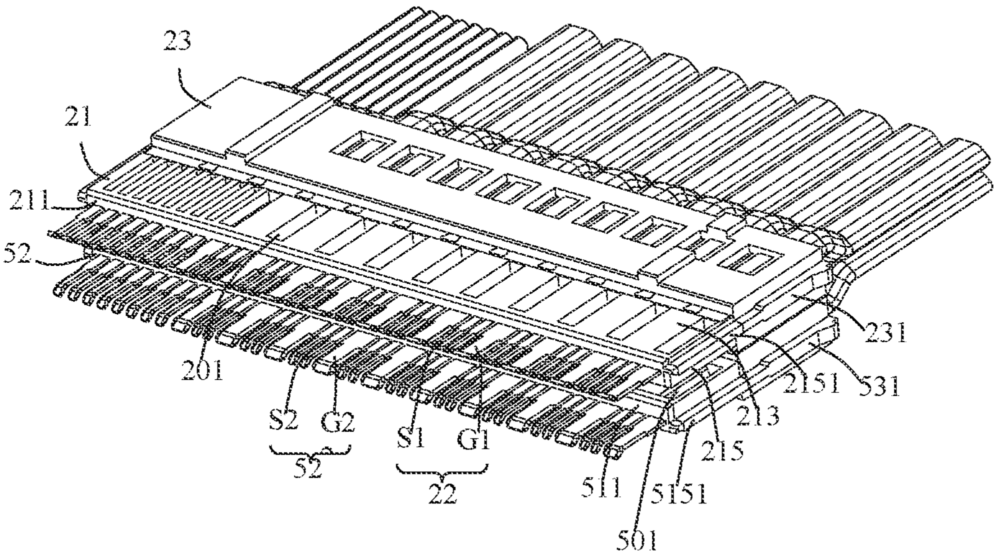
FIG. 11 is a schematic perspective view of a first terminal module and a second terminal module in FIG. 3.

Referring to FIG. 11, the first terminal module 2 includes a first insulating block 21 and a plurality of first conductive terminals 22 fixed to the first insulating block 21. In the illustrated embodiment of the present disclosure, the first conductive terminals 22 are insert-molded with the first insulating block 21. Certainly, in other embodiments, the first conductive terminals 22 may also be fixed to the first insulating block 21 by means of assembly or the like.

Figure 12:
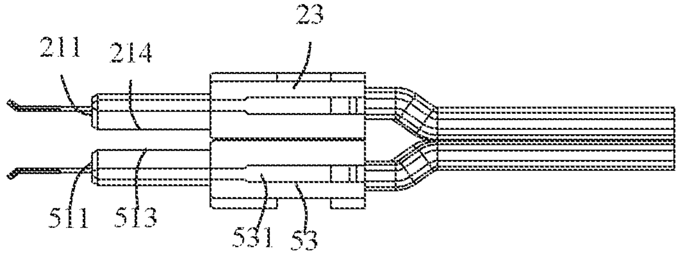
FIG. 12 is a right view of FIG. 11.
Figure 16:
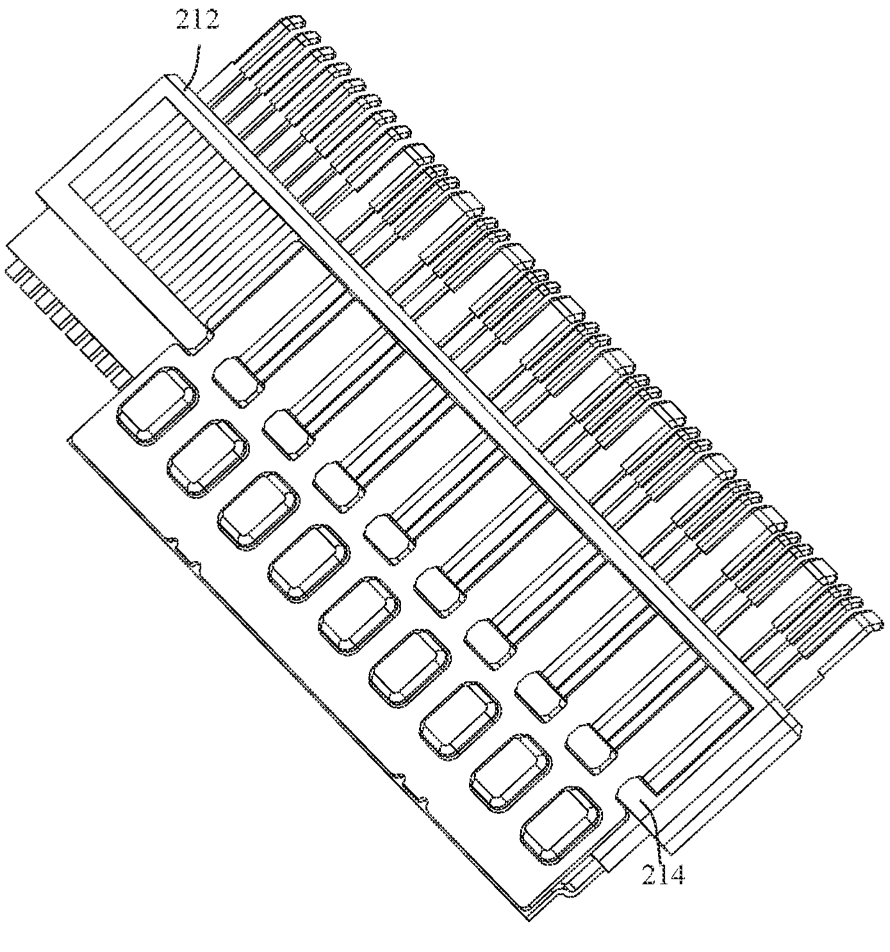
FIG. 16 is a schematic perspective view of some components in FIG. 13.

The first insulating block 21 is installed in the receiving groove 120, and the first insulating block 21 is disposed between the top wall portion 11 and the second inner plate 16. Specifically, as shown in FIG. 11, FIG. 12 and FIG. 16, the first insulating block 21 includes a first front end surface 211, a first rear end surface 212, a first top surface 213, a first bottom surface 214, and two first side surfaces 215. The first front end surface 211 is in contact with a surface of the first inner plate 15. The first bottom surface 214 is in contact with a surface of the second inner plate 16. The first inner plate 15 is used for axially limiting the first insulating block 21. The second inner plate 16 is used for radially limiting the first insulating block 21.

Figure 9:
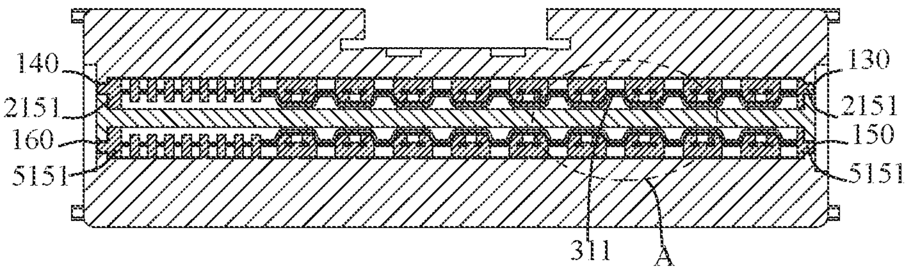
FIG. 9 is a schematic sectional view taken along line B-B in FIG. 8.

Referring to FIG. 6 and FIG. 9, the first insulating block 21 includes two first protrusions 2151 protruding outward from the two first side surfaces 215. The first side wall portion 13 of the insulating body 1 is provided with a first locking groove 130 which is formed by being recessed from an inner surface of the first side wall portion 13. The second side wall portion 14 of the insulating body 1 is provided with a second locking groove 140 which is formed by being recessed from an inner surface of the second side wall portion 14. Both the first locking groove 130 and the second locking groove 140 communicate with the receiving groove 120. One of the first protrusions 2151 is installed in the first locking groove 130, and the other of the first protrusions 2151 is installed in the second locking groove 140, so that the positioning and installation of the first insulating block 21 and the insulating body 1 are realized.

Figure 17:
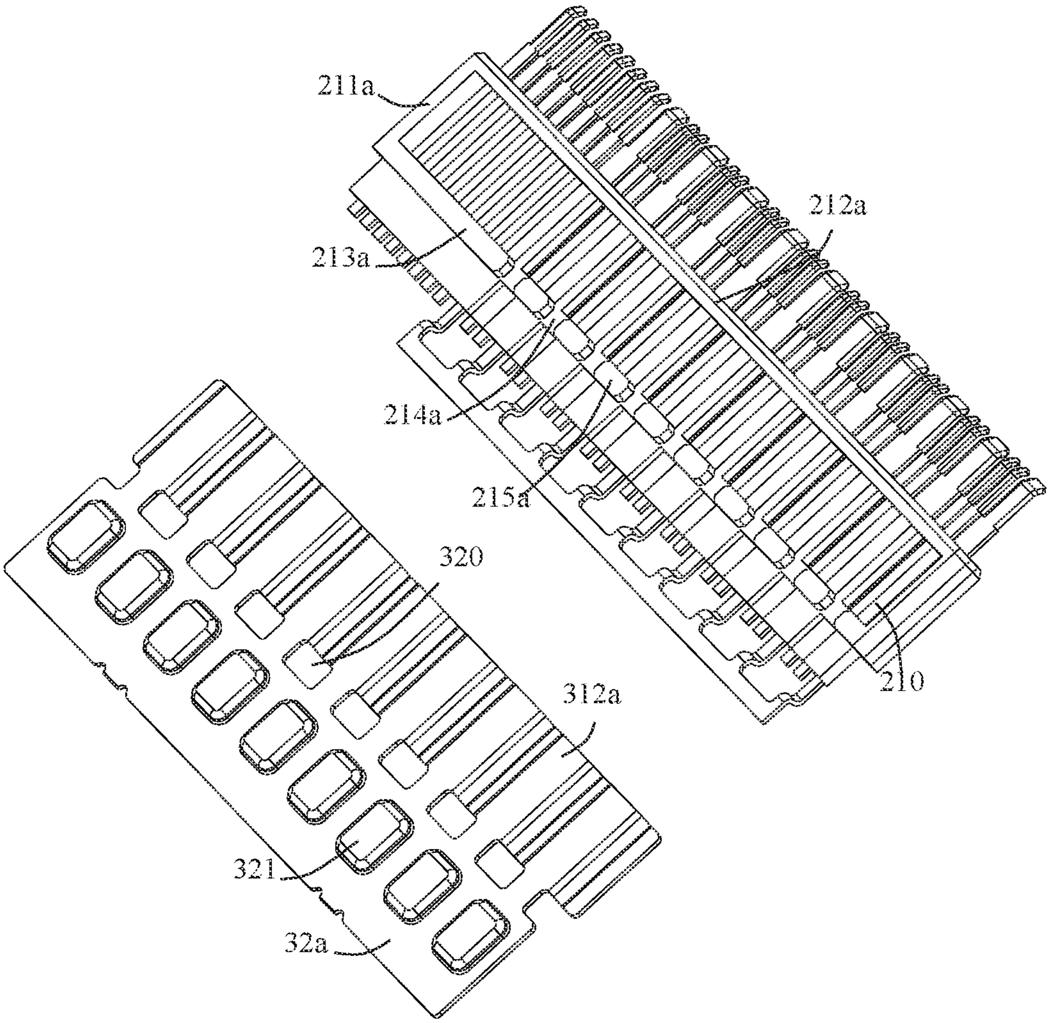
FIG. 17 is an exploded schematic view of FIG. 16.

Referring to FIG. 7 and FIG. 17, the first insulating block 21 defines a first installation groove 210 which is inwardly recessed relative to the first bottom surface 214. The first shielding piece 3 is installed in the first installation groove 210. After the first insulating block 21 is assembled to the insulating body 1, the first shielding piece 3 is located between the first insulating block 21 and the second inner plate 16. Referring to FIG. 17, a periphery of the first installation groove 210 forms a first surrounding frame structure **211*a*. The first surrounding frame structure 211*a* includes a first bar 212*a* and a second bar 213*a* opposite to the first bar 212*a*. The second bar 213*a* is provided with a plurality of first through openings 214*a*, and the plurality of first through openings 214*a* separates the second bar 213*a* to form a plurality of first positioning portions 215*a*. The first shielding piece 3 has a plurality of first through openings 320. The first positioning portions 215*a* are installed in the first through openings 320, so as to realize the positioning and installation of the first shielding piece 3 and the first insulating block 21**.

As shown in FIG. 11, the plurality of first conductive terminals 22 include a plurality of pairs of first signal terminals S1 and a plurality of first ground terminals G1. Each pair of the first signal terminals S1 and each of the first ground terminals G1 are arranged alternately. In the illustrated embodiment of the present disclosure, each side of each pair of the first signal terminals S1 is provided with one first ground terminal G1. Such an arrangement is beneficial to provide better shielding for each pair of the first signal terminals S1, thereby improving the quality of signal transmission. Preferably, each pair of the first signal terminals S1 is used to transmit differential pair signals. Each pair of the first signal terminals S1 forms a differential signal terminal pair.

Figure 14:
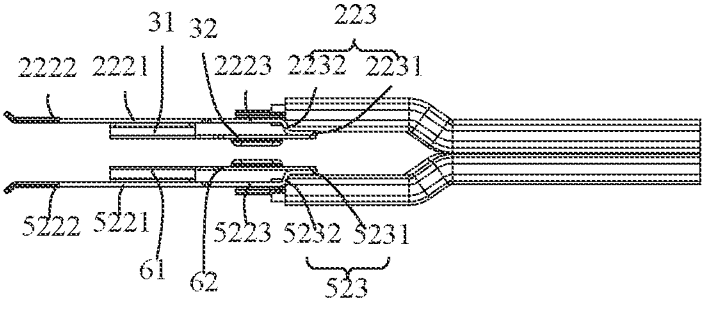
FIG. 14 is a right view of FIG. 13.

Referring to FIG. 14, each first ground terminal G1 includes a first main body portion 2221, a first mating portion 2222 extending from one end of the first main body portion 2221, and a first tail portion 2223 extending from another end of the first main body portion 2221. The first mating portion 2222 extends into the mating slot 110. The first mating portion 2222 is configured to mate with the mating connector. The first tail portions 2223 of the plurality of first ground terminals G1 are connected together through a first connection portion 223. In the present disclosure, the plurality of first ground terminals G1 are bridged together through the first connection portion 223, which can realize electrical connection between the plurality of first ground terminals G1 and reduce resonance in the plurality of first ground terminals G1, thereby improving signal integrity. In the illustrated embodiment of the present disclosure, the first terminal module 2 includes ten first ground terminals G1. The ten first ground terminals G1 include ten first tail portions 2223. The first connection portion 223 connects the ten first tail portions 2223 in series. In the illustrated embodiment of the present disclosure, the first connection portion 223 is made of a same material as the first ground terminal G1.

Figure 10:
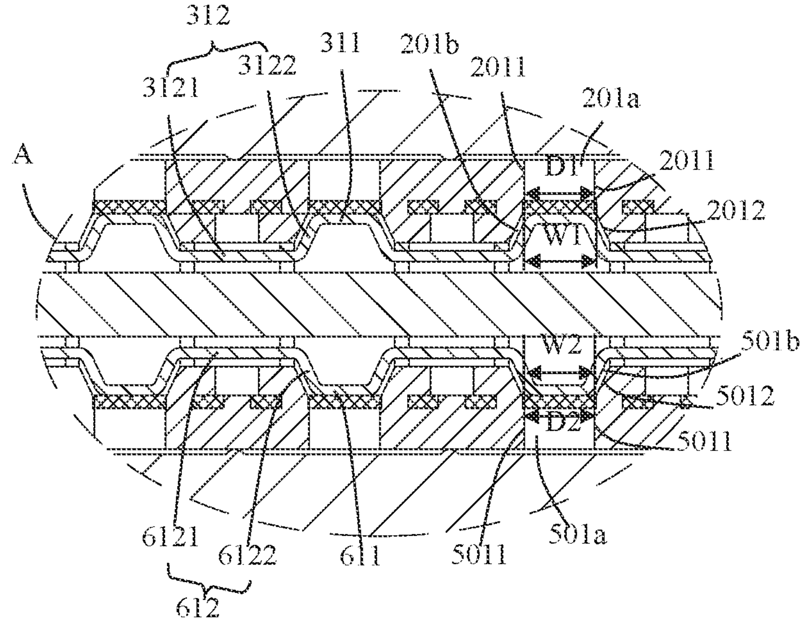
FIG. 10 is an enlarged schematic view of area A in FIG. 9.

The first main body portion 2221 is insert-molded with the first insulating block 21. Referring to FIG. 11, the first insulating block 21 is provided with a plurality of first through holes 201 which extend through the first top surface 213 and the first bottom surface 214. The first main body portion 2221 is at least partially exposed to a corresponding first through hole 201. Referring to FIG. 10, the first main body portion 2221 has a first width W1. Two first vertical hole walls 2011 are formed in the first through hole 201, and a first distance D1 is formed between the two first vertical hole walls 2011. A value of the first width W1 is not greater than a value of the first distance D1, so that the first main body portion 2221 can be more fully exposed to the corresponding first through hole 201. In the illustrated embodiment of the present disclosure, the value of the first width W1 is equal to the value of the first distance D1.

Figure 18:
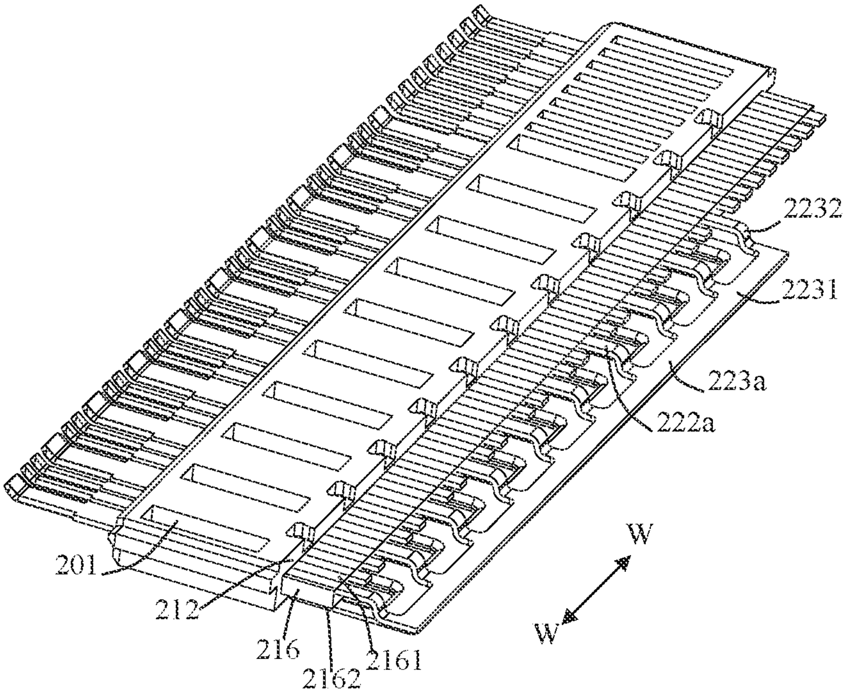
FIG. 18 is a schematic perspective view of the first terminal module and a first shielding piece in FIG. 13.

As shown in FIG. 18, the first insulating block 21 includes a first tongue portion 216 extending from the first rear end surface 212. The first tongue portion 216 includes a first extending surface 2161 and a second extending surface 2162 located on opposite sides in a thickness direction of the first tongue portion 216. The first tail portion 2223 is exposed to the first extending surface 2161. The first cable 4 is connected to the first tail portion 2223 exposed on the first extending surface 2161, so as to realize the electrical connection between the first cable 4 and the first ground terminal G1.

Figure 13:
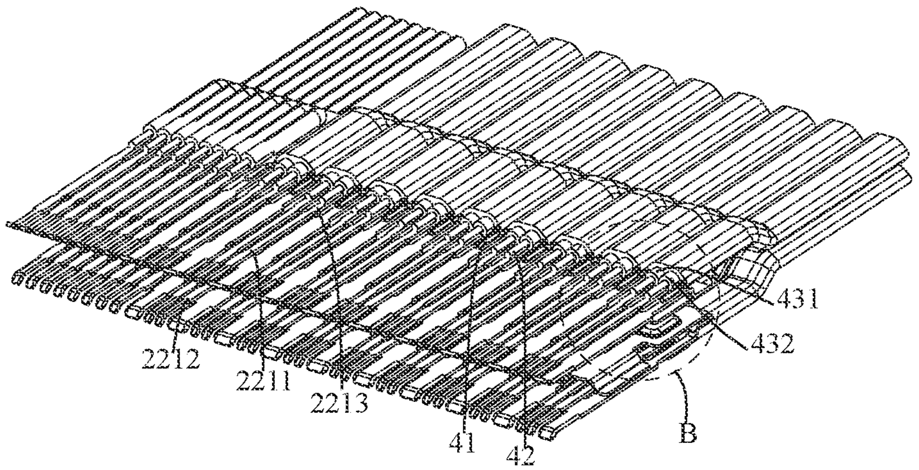
FIG. 13 is a schematic perspective view of some components in FIG. 11.

Referring to FIG. 13, the first signal terminal S1 includes a second main body portion 2211, a second mating portion 2212 extending from one end of the second main body portion 2211, and a second tail portion 2213 extending from another end of the second main body portion 2211. The second mating portion 2212 extends into the mating slot 110 and is configured to mate with the mating connector.

The second main body portion 2211 is insert-molded with the first insulating block 21. The second tail portion 2213 is exposed to the first extending surface 2161. The first cable 4 is connected to a corresponding second tail portion 2213 exposed on the first extending surface 2161, so as to realize the electrical connection between the first cable 4 and the first signal terminal S1. In the illustrated embodiment of the present disclosure, referring to FIG. 18, the plurality of first tail portions 2223 and the plurality of second tail portions 2213 are arranged in a row along a width direction of the first tongue portion 216. The width direction of the first tongue portion 216 is parallel to a width direction W-W of the insulating body 1.

Figure 27:
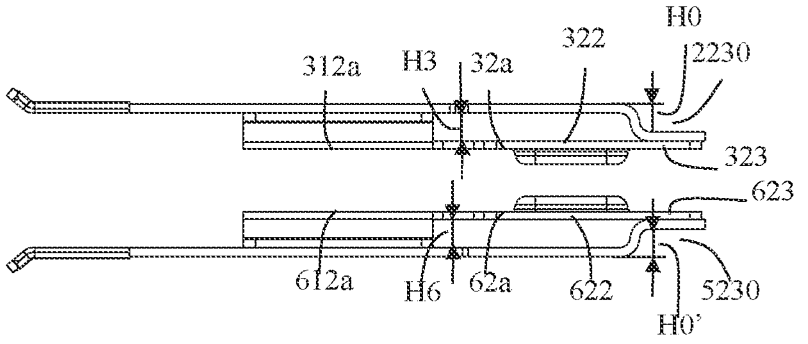
FIG. 27 is a right side view of FIG. 24.

Referring to FIG. 14, the first connection portion 223 includes a first flat portion 2231 and a plurality of first bent portions 2232 bent and extended from the first flat portion 2231. The plurality of first bent portions 2232 are connected to the plurality of first tail portions 2223. The first flat portion 2231 is parallel to the first tail portion 2223. The first flat portion 2231 and the first tail portion 2223 are located at different heights. Referring to FIG. 27, a first height difference H0 is formed between the first flat portion 2231 and the first tail portion 2223. Specifically, as shown in FIG. 18, the first tail portion 2223 has a first outer surface 222*a*. The first flat portion 2231 has a second outer surface 223*a*. The first height difference H0 is a vertical distance between the first outer surface 222*a* and the second outer surface 223*a*. As shown in FIG. 27, a first space 2230 is formed between the first bent portion 2232 and the first flat portion 2231 and is configured to partially receive the first cable 4. Such setting avoids interference with the installation of the first cable 4.

Referring to FIG. 11, the first terminal module 2 includes a second insulating block 23. The plurality of first tail portions 223, the first connection portion 223 and the first cables 4 are at least partially embedded in the second insulating block 23. The second insulating block 23 is integrally formed with the first insulating block 21 by injection molding. Two sides of the second insulating block 23 are provided with second protrusions 231, in which one of the second protrusions 231 is installed in the first locking groove 130, and the other of the second protrusions 231 is installed in the second locking groove 140, so that the positioning and installation of the second insulating block 23 and the insulating body 1 are realized.

As shown in FIG. 14, the first shielding piece 3 includes a first shielding portion 31 and a first extension portion 32 connected to the first shielding portion 31. The first main body portion 2221 is at least partially in contact with the first shielding portion 31. The first connection portion 223 is at least partially in contact with the first extension portion 32. Specifically, the first flat portion 2231 is in contact with the first extension portion 32. Through the contact between the first shielding piece 3 and two areas of the first ground terminal G1, good shielding can be formed on the first signal terminals S1, thereby reducing crosstalk interference among signals transmitted by adjacent pairs of the first signal terminals S1.

The first shielding portion 31 is integrally formed with the first extension portion 32. Referring to FIG. 10, the first shielding portion 31 includes a plurality of first abutting portions 311 and a plurality of first bridging portions 312. Two sides of each first bridging portion 312 are connected to two first abutting portions 311. The first main body portion 2221 is at least partially in contact with the first abutting portion 311. The first abutting portion 311 is not in contact with the first signal terminal S1, and the first bridging portion 312 is not in contact with the first signal terminal S1, so as to prevent a short circuit.

In the illustrated embodiment of the present disclosure, the first through hole 201 communicates with the first installation groove 210. The first abutting portion 311 protrudes into the first through hole 201 and is in contact with the first main body portion 2221.

In some embodiments, the first abutting portion 311 is fixed to a surface (for example, a lower surface) of the first main body portion 2221 by welding or soldering. The first extension portion 32 is fixed to a surface (for example, a lower surface) of the first flat portion 2231 by welding or soldering.

As shown in FIG. 10, the first bridging portion 312 includes a first straight portion 3121 and two first inclined portions 3122 connected to two sides of the first straight portion 3121. The first abutting portion 311 connects the two first inclined portions 3122. Two first inclined hole walls 2012 are formed in the first through hole 201. The first inclined hole wall 2012 is connected to the first vertical hole wall 2011. The first through hole 201 includes a first straight hole 201*a* with a uniform inner diameter and a first horn hole 201*b* with a gradually changing inner diameter. The first straight hole 201*a* communicates with the first horn hole 201*b*. The two first vertical hole walls 2011 are located on a periphery of the first straight hole 201*a*. The two first inclined hole walls 2012 are located on a periphery of the first horn hole 201*b*. Specifically, the inner diameter of the first horn hole 201*b* gradually expands outward from the first straight hole 201*a*. In the illustrated embodiment of the present disclosure, part of the first main body portion 2221 is located in the first straight hole 201*a*. Another part of the first main body portion 2221 extends into the first horn hole 201*b*. The first abutting portion 311 is connected to the first main body portion 2221 located in the first horn hole 201*b*. The two first inclined hole walls 2012 are adapted to the two first inclined portions 3122.

Referring to FIG. 17 and FIG. 27, the first straight portion 3121 includes a first surface 312*a* facing away from the first signal terminal S1. The first extension portion 32 includes a second surface 32*a* facing away from the first ground terminal G1. In the embodiment shown in the present disclosure, the first shielding piece 3 is made of a single metal sheet. The first surface 312*a* and the second surface 32*a* are located in a same plane, on the one hand, it is convenient to manufacture and shape; on the other hand, the overall height of the first shielding piece 3 does not increase, which reduces the occupied volume.

Figure 26:
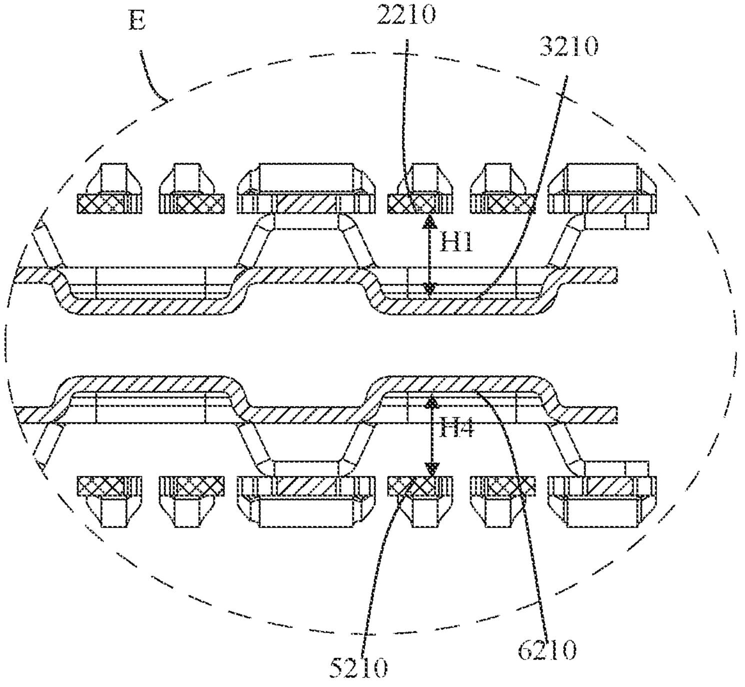
FIG. 26 is an enlarged schematic view of area E in FIG. 25.

Referring to FIG. 17, the first extension portion 32 is at least partially embedded in the second insulating block 23. The first extension portion 32 has a plurality of first protrusions 321 protruding beyond the second surface 32*a*. The plurality of first protrusions 321 are provided on the first extension portion 32 to increase the distance between the first shielding piece 3 and the second insulating block 23 when it is insert-molded with the second insulating block 23. At the same time, the holding force between them can also increase the impedance value. Referring to FIG. 26, along a thickness direction of the first extension portion 32, a first distance H1 is formed between the first protrusion 321 and the first signal terminal S1, and the first distance H1 is not less than 0.67 mm. Specifically, the first protrusion 321 has a third surface 3210. The first signal terminal S1 has a fourth surface 2210 which is an inner surface of the second tail portion 2213. The first distance H1 is a distance between the third surface 3210 and the fourth surface 2210 along the thickness direction of the first extension portion 32. In the illustrated embodiment of the present disclosure, the first distance H1 is 0.67 mm. The thickness direction of the first extension portion 32 is parallel to the height direction H-H of the insulating body 1.

Figure 28:
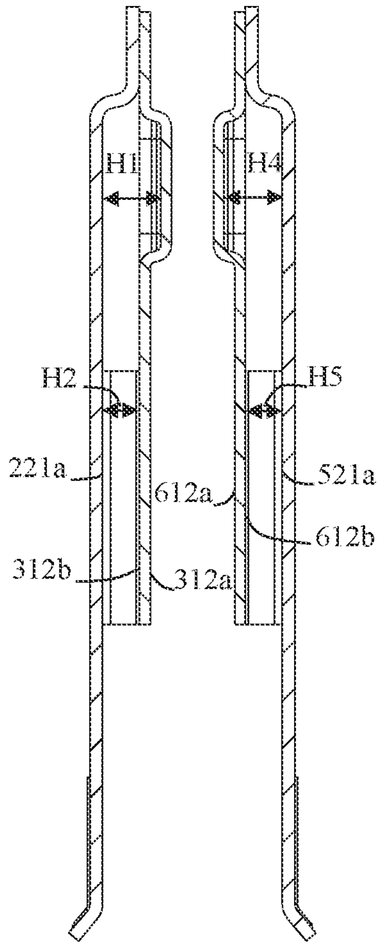
FIG. 28 is a schematic cross-sectional view taken along line F-F of FIG. 24.

Referring to FIG. 28, a second distance H2 is formed between the first straight portion 3121 and the second main body portion 2211. A value of the first height difference H0 is smaller than a value of the first distance H1. A value of the second distance H2 is smaller than the value of the first height difference H0. Specifically, the first straight portion 3121 includes the first surface 312*a* and the first inner surface 312*b* on opposite sides of its thickness. The second distance H2 is a vertical distance between the first inner surface 312*b* and the second inner surface 221*a* of the second main body portion 2211. The second inner surface 221*a* is located on a same plane as the fourth surface 2210 of the first signal terminal S1.

The first shielding portion 31 is installed in the first installation groove 210. The first extension portion 32 is located outside the first installation groove 210. The plurality of first through openings 320 are disposed on the first extension portion 32.

Referring to FIG. 27, the first extension portion 32 includes a first extension body 322 and a first contact portion 323. The first flat portion 2231 is welded and fixed to the first contact portion 323. The first extension body 322 is connected to the first shielding portion 31. The first protrusion 321 is located on the first extension body 322. The first through opening 320 is closer to the first shielding portion 31 relative to the first protrusion 321. The first extension body 322 is not in contact with either the first ground terminal G1 or the first signal terminal S1.

Referring to FIG. 27, a third distance H3 is formed between the first extension body 322 and the first tail portion 2223. A value of the third distance H3 is equal to the value of the second distance H2.

Referring to FIG. 13, each first cable 4 includes a first signal conductor 41 and a first ground conductor 42. The first ground conductor 42 is connected to a corresponding first tail portion 2223. The first signal conductor 41 is connected to a corresponding first signal terminal S1. The first ground conductor 42 and the first shielding piece 3 are located on opposite sides in a thickness direction of the first ground terminal G1, so as to avoid mutual interference between the first cable 4 and the first shielding piece 3.

Figure 15:
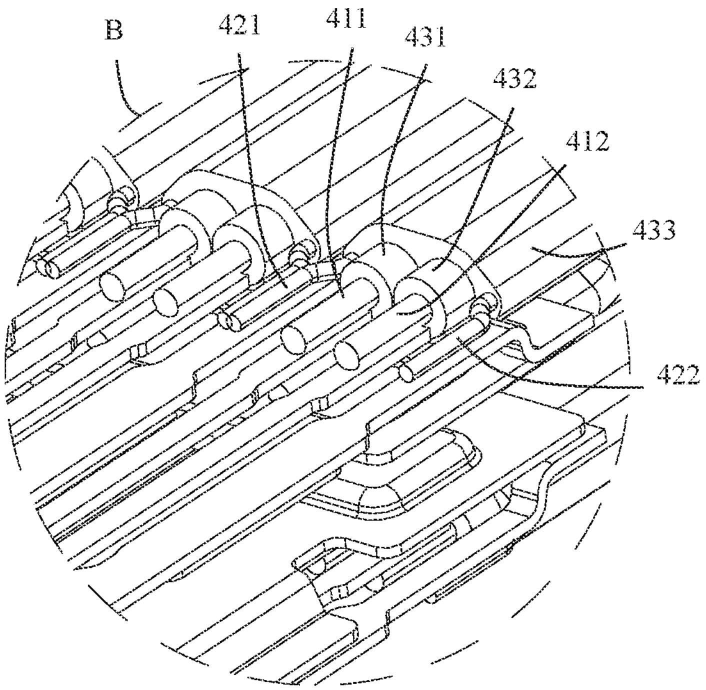
FIG. 15 is an enlarged schematic view of area B in FIG. 13.

Referring to FIG. 15, the first signal conductor 41 includes a first core wire 411 and a second core wire 412. The first core wire 411 and the second core wire 412 are connected to the second tail portions 2213 of the pair of first signal terminals S1, respectively, by welding or soldering. The first ground conductor 42 includes a first ground cable 421 and a second ground cable 422. The first ground cable 421 is connected to the first tail portion 2223 of one first ground terminal G1 by welding or soldering, and the second ground cable 422 is connected to the first tail portion 2223 of another first ground terminal G1.

Continuing to refer to FIG. 15, the first cable 4 further includes a first insulating layer 431 wrapped on the first core wire 411, a second insulating layer 432 wrapped on the second core wire 412, and a third insulating layer 433 wrapped on the first insulating layer 431 and the second insulating layer 432. The first ground cable 421 is located on one side of the first insulating layer 431. The second ground cable 422 is located on one side of the second insulating layer 432. The third insulating layer 433 wraps the first ground cable 421 and the second ground cable 422.

Referring to FIG. 11, the second terminal module 5 includes a third insulating block 51 and a plurality of second conductive terminals 52 fixed to the third insulating block 51. In the illustrated embodiment of the present disclosure, the second conductive terminals 52 are insert-molded with the third insulating block 51. In other embodiments, the second conductive terminals 52 may also be fixed to the third insulating block 51 by means of assembling or the like.

The third insulating block 51 is installed in the receiving groove 120, and the third insulating block 51 is disposed between the bottom wall portion 12 and the second inner plate 16. Specifically, referring to FIG. 21 and FIG. 23, the third insulating block 51 includes a second front end surface 511, a second rear end surface 512, a second top surface 513, a second bottom surface 514, and two second side surfaces 515. The second front end surface 511 is in contact with a surface of the first inner plate 15. The second top surface 513 is in contact with a surface of the second inner plate 16. The first inner plate 15 is used for axially limiting the third insulating block 51. The second inner plate 16 is used for radially limiting the third insulating block 51.

Figure 23:
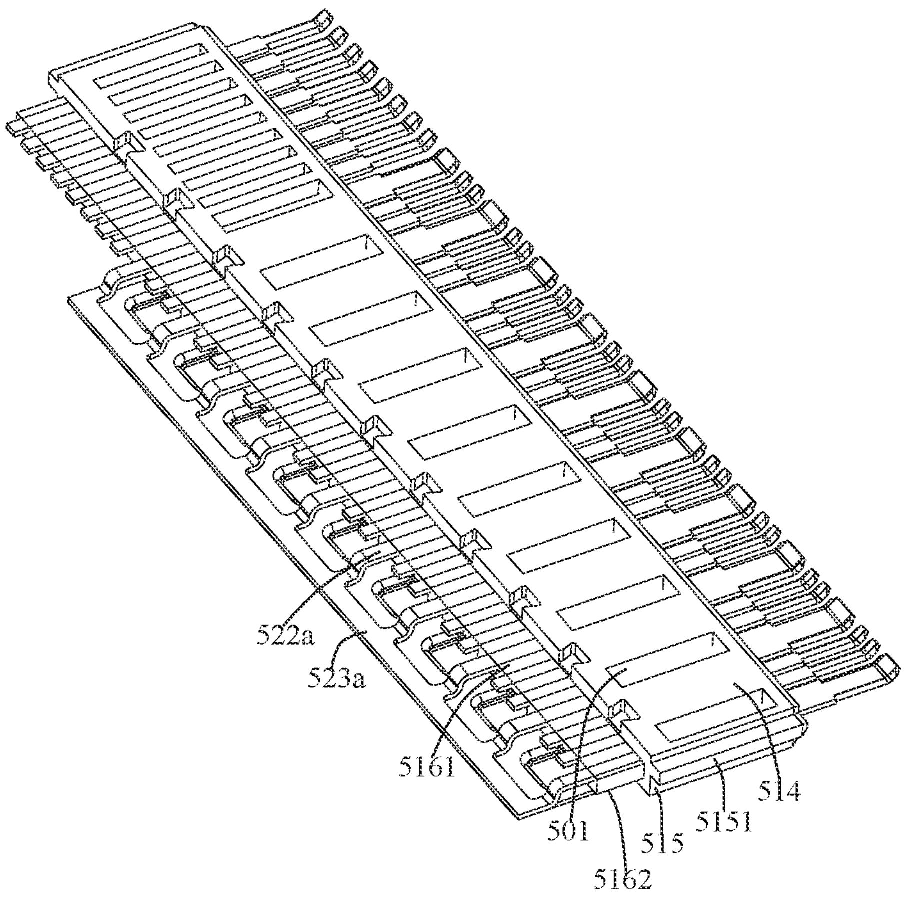
FIG. 23 is a schematic perspective view of the second terminal module and a second shielding piece in FIG. 19.
Figure 24:
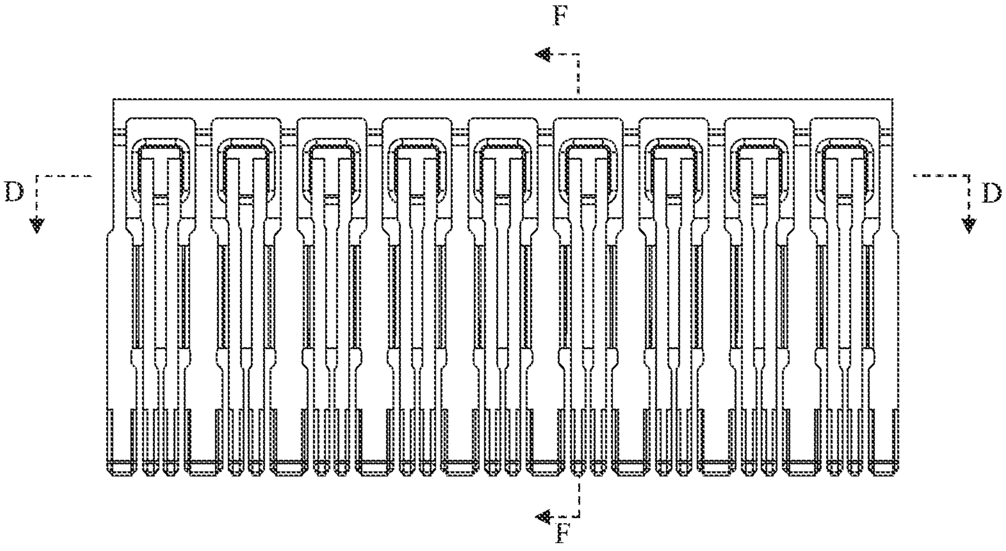
FIG. 24 is a top view of some components in FIG. 11.
Figure 25:
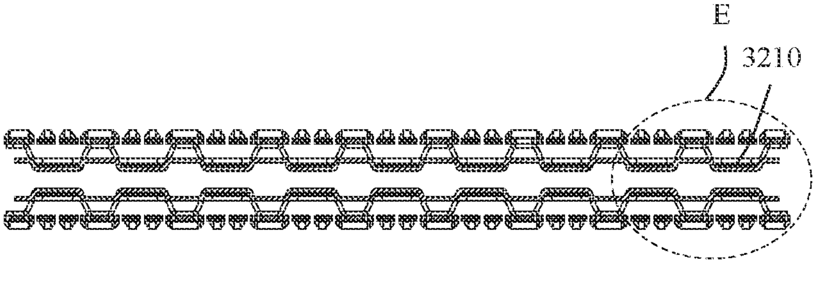
FIG. 25 is a schematic cross-sectional view taken along line D-D of FIG. 24.

Referring to FIG. 23, the third insulating block 51 includes two second protrusions 5151 protruding outward from the two second side surfaces 515. Referring to FIG. 9, the first side wall portion 13 of the insulating body 1 is further provided with a third locking groove 150. The second side wall portion 14 of the insulating body 1 is further provided with a fourth locking groove 160. Both the third locking groove 150 and the fourth locking groove 160 communicate with the receiving groove 120. One of the second protrusions 5151 is installed in the third locking groove 150, and the other of the second protrusions 5151 is installed in the fourth locking groove 160, so that the positioning and installation of the third insulating block 51 and the insulating body 1 are realized.

Figure 22:
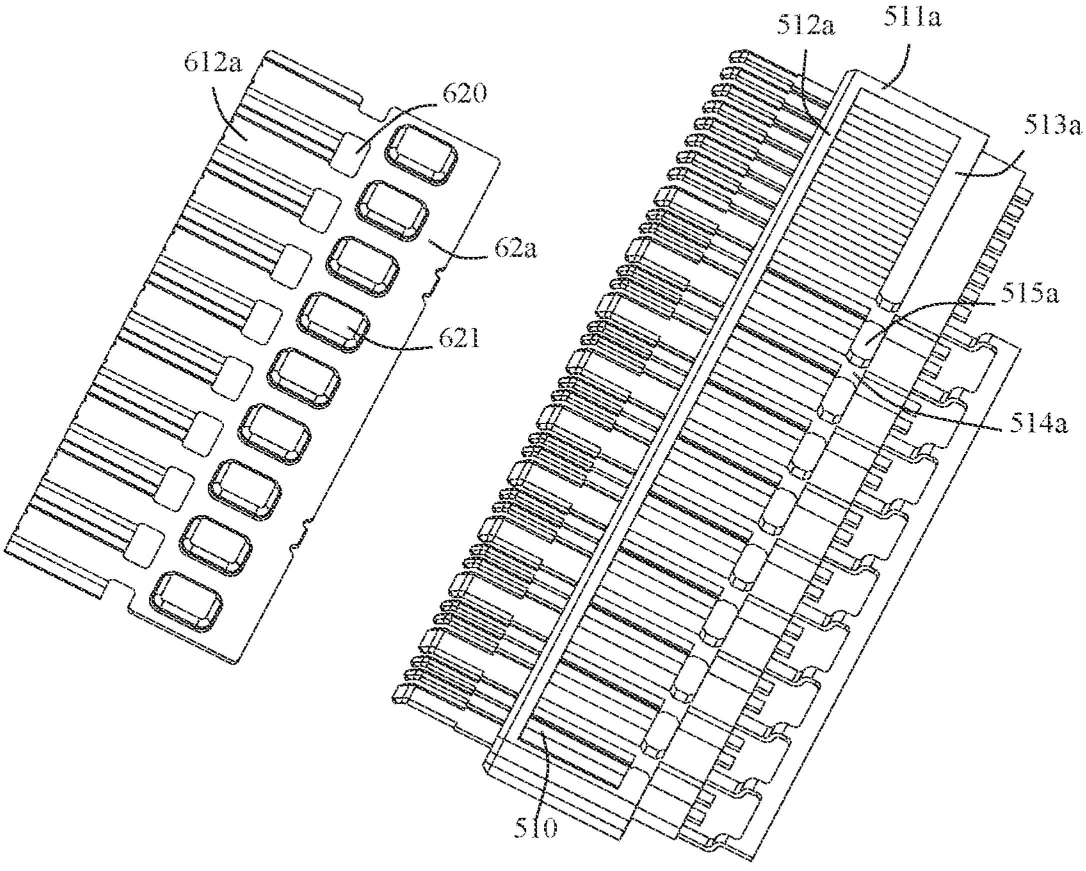
FIG. 22 is an exploded schematic view of FIG. 21.

Referring to FIG. 22, the third insulating block 51 has a second installation groove 510 which is inwardly recessed relative to the second top surface 513. The second shielding piece 6 is installed in the second installation groove 510. After the third insulating block 51 is assembled with the insulating body 1, the second shielding piece 6 is located between the third insulating block 51 and the second inner plate 16. A periphery of the second installation groove 510 forms a second surrounding frame structure 511*a*. The second surrounding frame structure 511*a* includes a third bar 512*a* and a fourth bar 513*a* opposite to the third bar 512*a*. The fourth bar 513*a* defines a plurality of second openings 514*a*. The plurality of second openings 514*a* separate the fourth bar 513*a* to form a plurality of second positioning portions 515*a*. The second shielding piece 6 is provided with a plurality of second through openings 620. The second positioning portions 515*a* are installed in the second through openings 620, so as to realize the positioning and installation of the second shielding piece 6 and the third insulating block 51.

Referring to FIG. 11, the plurality of second conductive terminals 52 includes a plurality of pairs of second signal terminals S2 and a plurality of second ground terminals G2. Each pair of the second signal terminals S2 and each of the second ground terminals G2 are arranged alternately. In the illustrated embodiment of the present disclosure, each side of each pair of the second signal terminals S2 is provided with one first ground terminal G1. Such an arrangement is beneficial to provide better shielding for each pair of the second signal terminals S2, thereby improving the quality of signal transmission. Preferably, each pair of the second signal terminals S2 is used to transmit differential pair signals. Each pair of the second signal terminals S2 forms a differential signal terminal pair.

Referring to FIG. 14, the second ground terminal G2 includes a third main body portion 5221, a third mating portion 5222 extending from one end of the third main body portion 5221, and a third tail portion 5223 extending from another end of the third main body portion 5221. The third mating portion 5222 extends into the mating slot 110 and is configured to mate with the mating connector. The third tail portions 5223 of the plurality of second ground terminals G2 are connected together through a second connection portion 523. In the present disclosure, the plurality of second ground terminals G2 are bridged together through the second connection portion 523, so as to realize the electrical connection between the plurality of second ground terminals G2 and reduce resonance in the plurality of second ground terminals G2, thereby improving signal integrity. In the illustrated embodiment of the present disclosure, the second terminal module 5 includes ten second ground terminals G2. The ten second ground terminals G2 include ten third tail portions 5223. The second connection portion 523 connects the ten third tail portions 5223 in series. In the illustrated embodiment of the present disclosure, the second connection portion 523 is made of a same material as the second ground terminal G2.

Referring to FIG. 11, the third main body portion 5221 is insert-molded with the third insulating block 51. The third insulating block 51 is provided with a plurality of second through holes 501 which extend through the second top surface 513 and the second bottom surface 514. The third main body portion 5221 is at least partially exposed to the second through hole 501. Referring to FIG. 10, the third main body portion 5221 has a second width W2. Two second vertical hole walls 5011 are formed in the second through hole 501. A second distance D2 is formed between the two second vertical hole walls 5011. A value of the second width W2 is not greater than a value of the second distance D2, so that the third main body portion 5221 can be more fully exposed to the second through hole 501. In the illustrated embodiment of the present disclosure, the value of the second width W2 is equal to the value of the second distance D2.

Referring to FIG. 23, the third insulating block 51 includes a second tongue portion 516 extending from the second rear end surface 512. The second tongue portion 516 includes a third extending surface 5161 and a fourth extending surface 5162 located on opposite sides in a thickness direction of the second tongue portion 516. The third tail portion 5223 is exposed to the third extending surface 5161. The second cable 7 is connected to the third tail portion 5223 exposed on the third extending surface 5161, so as to realize the electrical connection between the second cable 7 and the second ground terminal G2.

Figure 19:
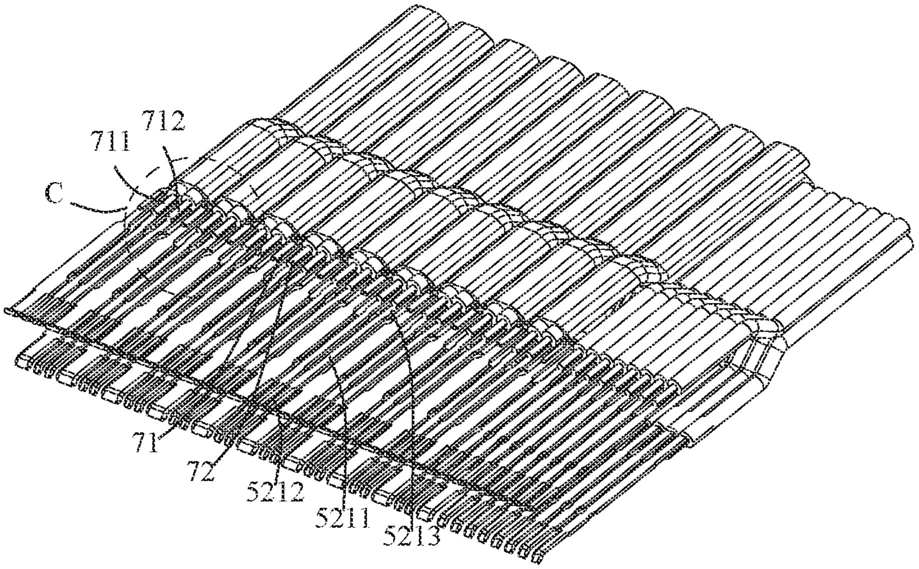
FIG. 19 is a schematic perspective view of FIG. 13 from another angle.

Referring to FIG. 19, the second signal terminal S2 includes a fourth main body portion 5211, a fourth mating portion 5212 extending from one end of the fourth main body portion 5211, and a fourth tail portion 5213 extending from another end of the fourth main body portion 5211. The fourth mating portion 5212 extends into the mating slot 110 and is configured to mate with the mating connector.

The fourth main body portion 5211 is insert-molded with the third insulating block 51. The fourth tail portion 5213 is exposed to the third extending surface 5161. The second cable 7 is connected to the fourth tail portion 5213 exposed on the third extending surface 5161, so as to realize the electrical connection between the second cable 7 and the second signal terminal S2. In the embodiment shown in the present disclosure, the plurality of third tail portions 5223 and the plurality of fourth tail portions 5213 are arranged in a row along a width direction of the second tongue portion 516. The width direction of the second tongue portion 516 is parallel to the width direction W-W of the insulating body 1.

Referring to FIG. 14, the second connection portion 523 includes a second flat portion 5231 and a plurality of second bent portions 5232 bent and extended from the second flat portion 5231. The plurality of second bent portions 5232 are connected to the plurality of third tail portions 5223. Referring to FIG. 27, the second flat portion 5231 is parallel to the third tail portion 5223. The second flat portion 5231 and the third tail portion 5223 are located at different heights. Referring to FIG. 27, a second height difference H0' is formed between the second flat portion 5231 and the third tail portion 5223. Specifically, as shown in FIG. 23, the third tail portion 5223 has a third outer surface **522*a*. The second flat portion 5231 has a fourth outer surface 523*a*. The second height difference H0' is a vertical distance between the third outer surface 522*a* and the fourth outer surface 523*a*. A second space 5230 between the second bent portion 5232 and the second flat portion 5231 is formed and configured to partially receive the second cable 7. Such setting avoids interference with the installation of the second cable 7**.

Referring to FIG. 12, the second terminal module 5 includes a fourth insulating block 53. The plurality of third tail portions 523, the second connection portion 523 and the second cables 7 are at least partially embedded in the fourth insulating block 53. The fourth insulating block 53 is integrally formed with the third insulating block 51 by injection molding. Both sides of the fourth insulating block 53 are provided with fourth protrusions 531, in which one of the fourth protrusions 531 is installed in the third locking groove 150, and the other of the fourth protrusions 531 is installed in the fourth locking groove 160, so that the positioning and installation of the fourth insulating block 53 and the insulating body 1 are realized.

Referring to FIG. 14, the second shielding piece 6 includes a second shielding portion 61 and a second extension portion 62 connected to the second shielding portion 61. The third main body portion 5221 is at least partially in contact with the second shielding portion 61. The second connection portion 523 is at least partially in contact with the second extension portion 62. Specifically, the second flat portion 5231 is in contact with the second extension portion 62. Through the contact between the second shielding piece 6 and two areas of the second ground terminal G2, good shielding can be formed on the second signal terminals S2, thereby reducing crosstalk interference among signals transmitted by adjacent pairs of the second signal terminals S2.

The second shielding portion 61 is integrally formed with the second extension portion 62. Referring to FIG. 10, the second shielding portion 61 includes a plurality of second abutting portions 611 and a plurality of second bridging portions 612. Both sides of each second bridging portion 612 are connected to two second abutting portions 611. The third body portion 5221 is at least partially in contact with the second abutting portion 611. The second abutting portion 611 is not in contact with the second signal terminal S2, and the second bridging portion 612 is not in contact with the second signal terminal S2, so as to prevent a short circuit.

Specifically, the second through hole 501 communicates with the second installation groove 510. The second abutting portion 611 protrudes into the second through hole 501 and is in contact with the third main body portion 5221.

In some embodiments, the second abutting portion 611 is fixed to a surface (for example, an upper surface) of the third main body portion 5221 by welding or soldering. The second extension portion 62 is fixed to a surface (for example, an upper surface) of the second flat portion 5231 by welding or soldering.

Referring to FIG. 10, the second bridging portion 612 includes a second straight portion 6121 and two second inclined portions 6122 connected to two sides of the second straight portion 6121. The second abutting portion 611 connects the two second inclined portions 6122. Two second inclined hole walls 5012 are formed in the second through hole 501. The second inclined hole wall 5012 is connected to the second vertical hole wall 5011. The second through hole 501 includes a second straight hole 501*a* with a uniform inner diameter and a second horn hole 501*b* with a gradually changing inner diameter. The second straight hole 501*a* communicates with the second horn hole 501*b*. The two second vertical hole walls 5011 are located on a periphery of the second straight hole 501*a*. The two second inclined hole walls 5012 are located on a periphery of the second horn hole 501*b*. Specifically, the inner diameter of the second horn hole 501*b* gradually expands outward from the second straight hole 501*a*. In the illustrated embodiment of the present disclosure, part of the third main body portion 5221 is located in the second straight hole 501*a*, and another part of the third main body portion 5221 extends into the second horn hole 501*b*. The second abutting portion 611 is connected to the third main body portion 5221 located in the second horn hole 501*b*. The two second inclined hole walls 5012 are adapted to the two second inclined portions 6122.

Referring to FIG. 27, the second straight portion 6121 includes a fifth surface 612*a* facing away from the second signal terminal S2. The second extension portion 62 includes a sixth surface 62*a* facing away from the second ground terminal G2. In the embodiment shown in the present disclosure, the second shielding piece 6 is made of a single metal sheet. The fifth surface 612*a* and the sixth surface 62*a* are in a same plane, on the one hand, it is convenient to manufacture and shape; on the other hand, the overall height of the second shielding piece 6 does not increase, which reduces the occupied volume.

Referring to FIG. 22, the second extension portion 62 is provided with a plurality of second protrusions 621 which protrude beyond the sixth surface 62*a*. The plurality of second protrusions 621 are provided on the second extension portion 62 to increase a distance between the second shielding piece 6 and the fourth insulating block 53 when it is insert-molded with the fourth insulating block 53. At the same time, the holding force between them can also increase the impedance value. Referring to FIG. 26, along a thickness direction of the second extension portion 62, a fourth distance H4 is formed between the second protrusion 621 and the second signal terminal S2. The fourth distance H4 is not less than 0.67 mm. Specifically, the second protrusion 621 has a seventh surface 6210. The fourth tail portion 5213 has an eighth surface 5210. The fourth distance H4 is a distance between the seventh surface 6210 and the eighth surface 5210 along the thickness direction of the second extension portion 62. In the illustrated embodiment of the present disclosure, the fourth distance H4 is 0.67 mm. The thickness direction of the second extension portion 62 is parallel to the height direction H-H of the insulating body 1.

Referring to FIG. 28, a fifth distance H5 is formed between the second straight portion 6121 and the fourth main body portion 5211. A value of the second height difference H0' is smaller than a value of the fourth distance H4. A value of the fifth distance H5 is smaller than the value of the second height difference H0'. Specifically, the second straight portion 6121 includes the fifth surface 612*a* and the third inner surface 612*b* on opposite sides of its thickness. The fifth distance H5 is a vertical distance between the third inner surface 612*b* and the fourth inner surface 521*a* of the fourth main body portion 5211. The fourth inner surface 521*a* is located on a same plane as the eighth surface 5210.

The second shielding portion 61 is installed in the second installation groove 510. The second extension portion 62 is located outside the second installation groove 510. The plurality of second through openings 620 are disposed on the second extension portion 62.

Referring to FIG. 27, the second extension portion 62 includes a second extension body 622 and a second contact portion 623. The second flat portion 5231 is fixed to the second contact portion 623 by welding or soldering. The second extension body 622 is connected to the second shielding portion 31. The second protrusion 621 is located on the second extension body 622. The second through opening 620 is closer to the second shielding portion 61 relative to the second protrusion 621. The second extension body 622 is not in contact with either the second ground terminal G2 or the second signal terminal S2.

Referring to FIG. 27, a sixth distance H6 is formed between the second extension body 622 and the third tail portion 5223. A value of the sixth distance H6 is equal to the value of the fifth distance H5.

Referring to FIG. 19, the second cable 7 includes a second signal conductor 71 and a second ground conductor 72. The second ground conductor 72 is connected to the third tail portion 5223. The second signal conductor 71 is connected to the second signal terminal S2. The second ground conductor 72 and the second shielding piece 6 are located on opposite sides in a thickness direction of the second ground terminal G2, so as to avoid mutual interference between the second cable 7 and the second shielding piece 6.

Figure 20:
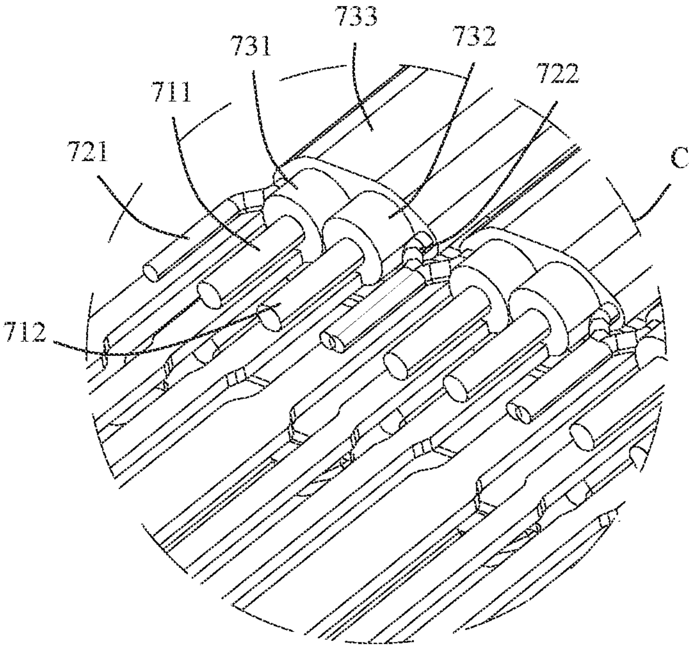
FIG. 20 is an enlarged schematic view of area C in FIG. 19.
Figure 21:
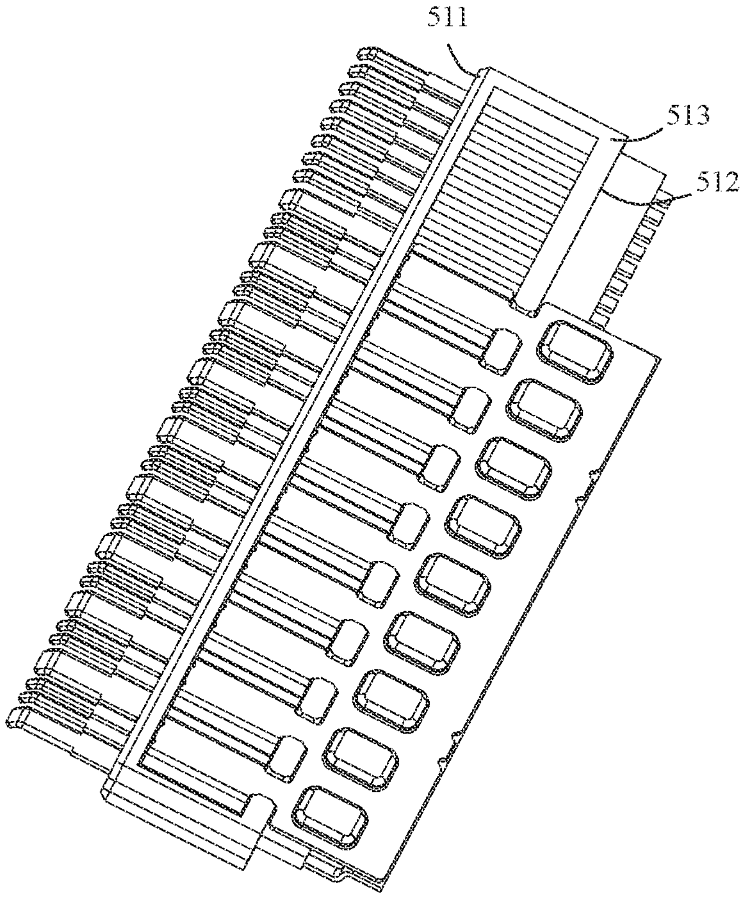
FIG. 21 is a schematic perspective view of some components in FIG. 19.

Referring to FIG. 20, the second signal conductor 71 includes a third core wire 711 and a fourth core wire 712. The third core wire 711 and the fourth core wire 712 are connected to the fourth tail portions 5213 of the pair of second signal terminals S2, respectively, by welding or soldering. The second ground conductor 72 includes a third ground cable 721 and a fourth ground cable 722. The third ground cable 721 is connected to the third tail portion 5223 of one of the second ground terminals G2 by welding or soldering, and the fourth ground cable 722 is connected to the third tail portion 5223 of the other second ground terminal G2 by welding or soldering.

Referring to FIG. 20, the second cable 7 further includes a fourth insulating layer 731 wrapped on the third core wire 711, a fifth insulating layer 732 wrapped on the fourth core wire 712, and a sixth insulating layer 733 wrapped around the fourth insulating layer 731 and the fifth insulating layer 732. The third ground cable 721 is located on one side of the fourth insulating layer 731. The fourth ground cable 722 is located on one side of the fifth insulating layer 732. The sixth insulating layer 733 wraps the third ground cable 721 and the fourth ground cable 722 at the same time.

In the illustrated embodiment of the present disclosure, the first shielding piece 3 and the second shielding piece 6 are located between the plurality of first conductive terminals 22 and the plurality of second conductive terminals 52. With such arrangement, the interference between the first signal terminals S1 and the second signal terminals S2 during signal transmission is reduced.

Referring to FIG. 3, the electrical connector 100 further includes a fifth insulating block 8. The fifth insulating block 8 is integrally formed with the second insulating block 23 and the fourth insulating block 53 by injection molding. Before the injection molding, the second insulating block 23 and the fourth insulating block 53 are located in the receiving groove 120 of the insulating body 1, and the fifth insulating block 8 is formed in the receiving groove 120. With such arrangement, the fifth insulating block 8 can be integrally formed with the second insulating block 23 and the fourth insulating block 53, and the stable assembly of the fifth insulating block 8 and the insulating body 1 can also be realized.

Figure 2:
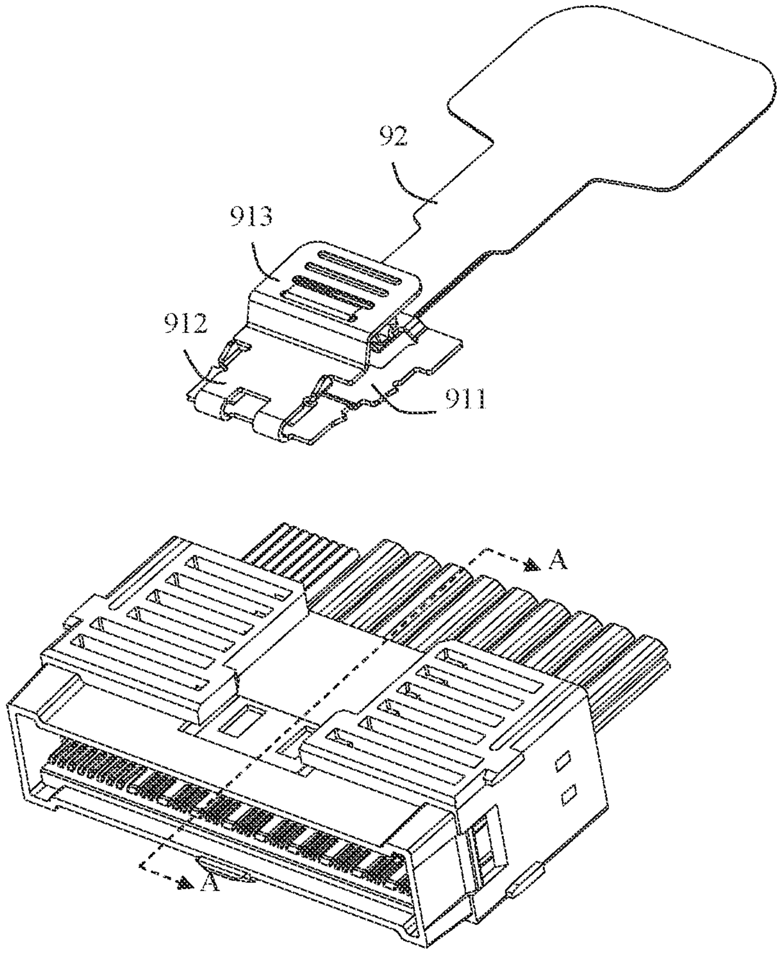
FIG. 2 is an exploded schematic view of FIG. 1.
Figure 5:
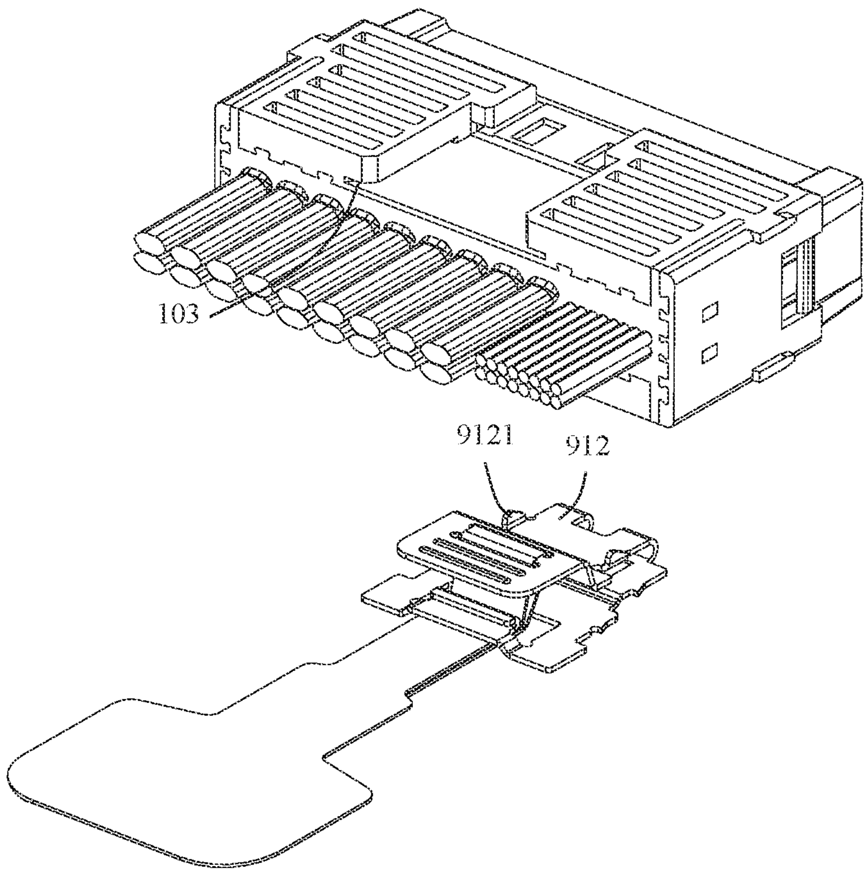
FIG. 5 is an exploded schematic view of FIG. 4.

Referring to FIG. 2, the electrical connector 100 includes a pull strap unlocking device 91 installed on the insulating body 1. The pull strap unlocking device 91 is used for locking and unlocking with the mating connector. The pull strap unlocking device 91 includes a fixing portion 911, a locking piece 912 bent upward and backward from a front end of the fixing portion 911, and a fastening portion 913 extending upward and backward from a rear end of the locking piece 912. The electrical connector 100 also includes a pull strap 92. The pull strap 92 is tied on the fastening portion 913. As shown in FIG. 5, the insulating body 1 is provided with a slot 103, and the fixing portion 911 is fixed in the slot 103.

Referring to FIG. 5, the locking piece 912 is provided with two locking protrusions 9121 protruding upward. The fastening portion 913 protrudes upward beyond the locking protrusions 9121. Since the pull strap unlocking device 91 is roughly U-shaped, the locking piece 912 can be deformed downward under the pull of the pull strap 92. The locking protrusions 9121 are configured to be locked with the mating connector.

Compared with the prior art, the present disclosure uses the first connection portion 223 to connect the plurality of first ground terminals G1 together. The first shielding portion 31 is in contact with the first main body portion 2221 of the first ground terminal G1. The first extension portion 32 is in contact with the first connection portion 223. As a result, the first shielding piece 3 is in contact with the two areas of the first ground terminal G1, which can form a good shielding for the first signal terminal S1, and reduce the crosstalk interference between signals transmitted by adjacent pairs of the first signal terminals S1.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body;

a first terminal module mounted to the insulating body; the first terminal module comprising a plurality of first conductive terminals, the plurality of first conductive terminals comprising a plurality of pairs of first signal terminals, a plurality of first ground terminals and a first connection portion, each pair of the first signal terminals and each of the first ground terminals being arranged alternately; each first ground terminal comprising a first main body portion, a first mating portion extending from one end of the first main body portion, and a first tail portion extending from another end of the first main body portion; the first tail portions of the plurality of first ground terminals being connected in series through the first connection portion;

a first shielding piece comprising a first shielding portion and a first extension portion connected to the first shielding portion; the first main body portions of the plurality of first ground terminals being at least partially in contact with the first shielding portion; the first connection portion being at least partially in contact with the first extension portion; and a plurality of first cables, each first cable comprising a first signal conductor and a first ground conductor, the first ground conductor being connected to a corresponding first tail portion, the first signal conductor being connected to a corresponding first signal terminal; the first ground conductor and the first shielding piece being located on opposite sides in a thickness direction of the first ground terminal.

2. The electrical connector according to claim 1, wherein the first connection portion comprises a first flat portion and a plurality of first bent portions bent and extended from the first flat portion; the plurality of first bent portions are connected to the plurality of first tail portions, respectively; the first flat portion is in contact with the first extension portion.

3. The electrical connector according to claim 2, wherein the first extension portion comprises a first extension body and a first contact portion; the first flat plate portion is fixed to the first contact portion by soldering or welding; the first extension body is connected to the first shielding portion; the first extension body is not in contact with the first ground terminals.

4. The electrical connector according to claim 2, wherein the first flat portion and the first tail portion are located at different heights; a first space is formed between the first bent portion and the first flat portion; the first space is configured to accommodate a corresponding first cable.

5. The electrical connector according to claim 1, wherein the first shielding portion and the first extension portion are integrally formed.

6. The electrical connector according to claim 1, wherein the first shielding portion comprises a plurality of first abutting portions and a plurality of first bridging portions; two sides of each first bridging portion are connected to two first abutting portions, respectively; the first main body portion is at least partially in contact with a corresponding first abutting portion.

7. The electrical connector according to claim 6, wherein the first bridging portion comprises a first straight portion and two first inclined portion connected to two sides of the first straight portion; the first straight portion comprises a first surface facing away from the first signal terminal; the first extension portion comprises a second surface facing away from the first ground terminal; the first surface and the second surface are located in a same plane.

8. The electrical connector according to claim 7, wherein the first extension portion is provided with a plurality of first protrusions; the first protrusion protrudes beyond the second surface; along a thickness direction of the first extension portion, a first distance is formed between the first protrusion and the first signal terminal, where the first distance is not less than 0.67 mm.

9. The electrical connector according to claim 1, wherein the first terminal module comprises a first insulating block, the plurality of first conductive terminals are fixed to the first insulating block, the insulating body defining a receiving groove, and the first insulating block is mounted in the receiving groove;

the first insulating block comprises a plurality of first positioning portions, the first extension portion defines a plurality of first through openings in which the plurality of first positioning portions are installed.

10. The electrical connector according to claim 1, further comprising a second terminal module mounted to the insulating body, a second shielding piece mated with the second terminal module and a plurality of second cables connected to the second terminal module;

wherein the second terminal module comprises a plurality of second conductive terminals, the plurality of second conductive terminals comprise a plurality of pairs of second signal terminals and a plurality of second ground terminals, each pair of the second signal terminals and each of the second ground terminals are arranged alternately;

each second cable comprises a second signal conductor and a second ground conductor, the second ground conductor is connected to a corresponding second ground terminal, the second signal conductor is connected to a corresponding second signal terminal, the second ground conductor and the second shielding piece are located on opposite sides in a thickness direction of the second ground terminal;

the first shielding piece and the second shielding piece are located between the plurality of first conductive terminals and the plurality of second conductive terminals.

11. An electrical connector, comprising:

an insulating body defining a mating slot and a receiving groove communicating with the mating slot, the mating slot being configured to receive a mating connector;

a first terminal module at least partially received in the receiving groove of the insulating body; the first terminal module comprising a plurality of first conductive terminals, the plurality of first conductive terminals comprising a plurality of pairs of first signal terminals, a plurality of first ground terminals and a first connection portion, each pair of the first signal terminals and each of the first ground terminals being arranged alternately; each first ground terminal comprising a first main body portion, a first mating portion and a first tail portion; the first tail portions of the plurality of first ground terminals being connected in series through the first connection portion;

a second terminal module at least partially received in the receiving groove of the insulating body; the second terminal module comprising a plurality of second conductive terminals, the plurality of second conductive terminals comprising a plurality of pairs of second signal terminals, a plurality of second ground terminals and a second connection portion, each pair of the second signal terminals and each of the second ground terminals being arranged alternately; each second ground terminal comprising a second main body portion, a second mating portion and a second tail portion; the second tail portions of the plurality of second ground terminals being connected in series through the second connection portion;

a first shielding piece comprising a first shielding portion and a first extension portion; the first main body portions of the plurality of first ground terminals being at least partially in contact with the first shielding portion; the first connection portion being at least partially in contact with the first extension portion; and a second shielding piece comprising a second shielding portion and a second extension portion; the second main body portions of the plurality of second ground terminals being at least partially in contact with the second shielding portion; the second connection portion being at least partially in contact with the second extension portion;

wherein the first shielding piece and the second shielding piece are disposed adjacent to each other, and are located between the plurality of first conductive terminals and the plurality of second conductive terminals along a thickness direction of the electrical connector.

12. The electrical connector according to claim 11, further comprising a plurality of first cables, each first cable comprising a first signal conductor and a first ground conductor, the first ground conductor being connected to a corresponding first tail portion, the first signal conductor being connected to a corresponding first signal terminal; the first ground conductor and the first shielding piece being located on opposite sides in the thickness direction of the electrical connector.

13. The electrical connector according to claim 12, wherein the first connection portion comprises a first flat portion and a plurality of first bent portions bent and extended from the first flat portion; the plurality of first bent portions are connected to the plurality of first tail portions, respectively; the first flat portion is in contact with the first extension portion.

14. The electrical connector according to claim 13, wherein the first extension portion comprises a first extension body and a first contact portion; the first flat plate portion is fixed to the first contact portion by soldering or welding; the first extension body is connected to the first shielding portion; the first extension body is not in contact with the first ground terminals.

15. The electrical connector according to claim 13, wherein the first flat portion and the first tail portion are located at different heights; a first space is formed between the first bent portion and the first flat portion; the first space is configured to accommodate a corresponding first cable.

16. The electrical connector according to claim 12, wherein the first shielding portion and the first extension portion are integrally formed.

17. The electrical connector according to claim 12, wherein the first shielding portion comprises a plurality of first abutting portions and a plurality of first bridging portions; two sides of each first bridging portion are connected to two first abutting portions, respectively; the first main body portion is at least partially in contact with a corresponding first abutting portion.

18. The electrical connector according to claim 17, wherein the first bridging portion comprises a first straight portion and two first inclined portion connected to two sides of the first straight portion; the first straight portion comprises a first surface facing away from the first signal terminal; the first extension portion comprises a second surface facing away from the first ground terminal; the first surface and the second surface are located in a same plane.

19. The electrical connector according to claim 18, wherein the first extension portion is provided with a plurality of first protrusions; the first protrusion protrudes beyond the second surface; along a thickness direction of the first extension portion, a first distance is formed between the first protrusion and the first signal terminal, where the first distance is not less than 0.67 mm.

20. The electrical connector according to claim 12, wherein the first terminal module comprises a first insulating block, the plurality of first conductive terminals are fixed to the first insulating block, the insulating body defining a receiving groove, and the first insulating block is mounted in the receiving groove;

the first insulating block comprises a plurality of first positioning portions, the first extension portion defines a plurality of first through openings in which the plurality of first positioning portions are installed.

* * * * *